United States Patent [19]

Natta et al.

[11] 3,860,442

[45] Jan. 14, 1975

[54] PROCESS FOR BONDING ETHYLENE COPOLYMERS TO FIBERS

[75] Inventors: Giulio Natta; Febo Severini, both of Milan; Augusto Portolani, Ferrara; Carlo Tavazzani, Milan, all of Italy

[73] Assignee: Montecantini Edison S.p.A., Milan, Italy

[22] Filed: Apr. 18, 1972

[21] Appl. No.: 245,289

Related U.S. Application Data

[63] Continuation of Ser. No. 876,184, Nov. 28, 1969, abandoned.

[52] U.S. Cl........... 117/76 T, 117/72, 117/138.8 N, 117/138.8 F, 117/143, 117/145, 156/335, 260/29.6 R
[51] Int. Cl..................... D06m 15/28, D06m 15/46
[58] Field of Search............ 117/76 T, 72, 138.8 N, 117/138.8 F, 143 A, 145; 156/335

[56] References Cited
UNITED STATES PATENTS

| | | | |
|---|---|---|---|
| 3,262,482 | 7/1966 | Clifton et al. | 117/76 T X |
| 3,271,477 | 9/1966 | Kresge | 260/877 |
| 3,288,739 | 11/1966 | Natta et al. | 260/29.6 |
| 3,427,183 | 2/1969 | Portolani et al. | 117/76 T |
| 3,513,057 | 5/1970 | Falcone et al. | 156/335 X |

FOREIGN PATENTS OR APPLICATIONS

| 648,969 | 12/1964 | Belgium | 156/335 |
|---|---|---|---|

*Primary Examiner*—Ralph Husack

[57] ABSTRACT

An improved process for bonding natural or synthetic fibers to elastomeric copolymers of ethylene and higher alpha-olefins or to terpolymers of ethylene, higher alpha-olefins and cyclic or acyclic dienes having non-conjugated double bonds is disclosed. The process comprises coating the fibers with an aqueous dispersion of phenol-aldehyde resin and a latex of an elastomeric ethylene copolymer or terpolymer as defined above which is grafted with an acid, water-soluble vinyl or vinylidene monomer, the aqueous dispersion having been allowed to mature for from 10 to 80 hours after preparation thereof. After the fibers are coated with the aqueous dispersion and dried, an elastomeric ethylene copolymer or terpolymer as defined above and containing a vulcanizing agent is contacted therewith and vulcanized thereon.

17 Claims, No Drawings

PROCESS FOR BONDING ETHYLENE COPOLYMERS TO FIBERS

This is a continuation, of application Ser. No. 876,184, filed Nov. 28, 1969, now abandoned.

The present invention relates to aqueous latexes of graft copolymers of acid vinyl or vinylidene monomers on olefin copolymers and terpolymers and to a process of preparation thereof; it relates also to the use of these latexes for various applications, specially for bonding elastomeric polymers of ethylene with alpha-olefins and possibly with a cyclic or acyclic diene to a substrate consisting of natural or synthetic fibres, superficially oxydated metal surfaces and glass fibres, as well as to the shaped articles obtained therefrom.

It is known that in the usual technique for the preparation of emulsion graft compounds of natural or snythetic rubbers, the monomers to be grafted must be capable of swelling the rubber used. It is also known that if a large amount of soap is used, the monomers tend to polymerize leading to the formation of homopolymers.

It has now surprisingly been found that the water soluble acid monomers can be copolymerized in the presence of an aqueous emulsion of a saturated ethylene-alpha-olefin copolymer or of a low unsaturation terpolymer and grafted onto said copolymers or terpolymers in spite of the use of high amounts of surface active agents which must be present in high amounts in order to allow the preparation of the emulsion of olefin terpolymer to be grafted.

Object of this invention is a process for preparing aqueous latexes of graft copolymers, characterized in that a saturated amorphous ethylene-alpha-olefin copolymer or a low unsaturation olefin terpolymer in aqueous emulsion with an anionic surface-active agent is subjected to graft polymerization with a water soluble acid vinyl or vinylidene monomer in the presence of a radical initiator, that is admixed or not with an anionic surface active agent.

Another object are the aqueous latexes of these graft copolymers.

A further object is the use of these latexes for various applications.

Another object is a process for bonding elastomeric olefin copolymers or terpolymers to a non-compatible substrate, such as a natural or synthetic fiber, by using said aqueous latexes and by subsequent covulcanization.

A further object are the vulcanized articles obtained by the vulcanization bonding in which said latexes are used.

Acid water-soluble vinyl or vinylidene monomers which are suitable for the grafting in aqueous emulsion according to the present invention are preferably selected from the class consisting of acrylic acid, methacrylic acid, their alkyl esters, mixtures of acrylic and methacrylic acids, mixtures of acrylic or methacrylic acid with their alkyl esters, sorbic acid, muconic acid, crotonic acid and their alkyl esters. Of the alkyl esters the lower alkyl esters are preferred.

These monomers are used in amounts comprised between 1 and 50 parts per 100 parts by weight of the copolymer or terpolymer present in the aqueous emulsion.

The amount of monomer to be grafted can be added in a single time or in successive times during the reaction. Moreover mixture of different monomers can also be used.

For the graft polymerization, initiators capable of giving free radicals can be used, such as, e.g., organic peroxides and hydroperoxides, organic diazocompounds, such as: benzoyl peroxide, p-chloro-benzoyl peroxide, dicumyl peroxide, di-tert.butyl peroxide, tert.butyl hydroperoxide, cumene hydroperoxide, diazobutirronitrile, diazoaminobenzene, etc. Mixed peroxides such as acetylbenzoylperoxide, or inorganic peroxides such as e.g. potassium or ammonium persulfate and hydrogen peroxide, can also be used.

Moreover as the initiators it is possible to use Redox mixtures consisting of peroxides selected from those specified above and of a reducing agent, such as, e.g., ferrous sulfate, iron acetylacetonate, polyethyleneamine, etc.

The use of Redox mixtures makes it possible to carry out the graft reaction at temperatures lower than those employable with organic peroxides alone.

The initiator is used in amounts from 0.1 to 10 parts by weight, perferably from 1 to 4 parts, per 100 parts of polymer or terpolymer.

The initiator must be dispersed in the emulsion to which it can be added, e.g., in solution in an organic solvent such as e.g., toluene, benzene, dimethylphthalate, or in the same monomer to be grafted. The initiator may be admixed with an anionic surface-active agent that is used in amounts equal to or lower than the amount of radical initiator used.

The ethylene-alpha-olefin copolymers and the low unsaturation terpolymers are obtained, as well known, by using catalytic systems soluble or dispersed in hydrocarbons, which consist of a transition metal compound, and particularly a vanadium compound, and an organometallic compound of aluminum. Examples of preferred catalytic components are: vanadium tetrachloride, oxychloride and acetylacetonate and, respectively, triethyl aluminum, aluminum tri-tert.butyl and aluminum diethylmonochloride.

Among the ethylene-alpha-olefin copolymers are preferred the copolymers of ethylene with propylene or butene-1 having an ethylene content from 20 to 80% by mols and a molecular weight comprised between 50,000 and 500,000.

The low unsaturation olefin terpolymers which are grafted are the terpolymers of ethylene/alpha-olefin/cyclic or acyclic diene with conjugated or non-conjugated double bonds.

Particularly preferred are the terpolymers of ethylene/propylene/cyclooctadiene-1,5 and ethylene/propylene/bicyclopentadiene; terpolymers in which the olefin is butene-1 or pentene-1 and in which the diene is selected from butadiene, isoprene and hexadiene-1,4 can also be used.

These terpolymers are characterized by the presence of 0.05–1 double bonds per 100 carbon atoms or by a diene content from 1 to 20% by mols, by an ethylene content from 20 to 80% by mols and by a molecular weight comprised between 50,000 and 500,000.

In order to obtain high grafting values, terpolymers free of substances capable of hindering or, anyhow, of limiting the graft reaction, such as, e.g., the antioxidants and the small amounts of diolefins or of oligomers rich of diolefins which are sometimes present in the crude polymerization products, must be used.

For this purpose, materials suitable for the preparation of graft copolymers can be obtained, e.g., in laboratory by extracting the crude polymerization products with acetone in a Kumagawa extractor.

An aqueous latex is prepared using a copolymer or a terpolymer (either crude as it is or washed with acetone), then to this latex are added while keeping the mass under agitation the monomer or the mixture of monomers to be grafted, and then the radical initiator admixed or not with an anionic surface-active agent.

The anionic surface-active agents suitable for the preparation of the latex are: ammonium salt of sulphate of an alkyl-phenol polyethylene-oxyethanole, sodium lauryl sulphate, oleates, palmitates and stearates of sodium and potassium.

The aqueous latex of alpha-olefin ethylene copolymer is prepared as follows. A 1–30% by weight paste of an ethylene-alpha-olefin copolymer is emulsified in a hydrocarbon solvent with a solution of 1–30 parts by weight of an anionic surface-active agent per 100 parts of copolymer, in an amount of water equal to or lower than the weight of said hydrocarbon solvent.

The hydrocarbon solvent is removed from the obtained emulsion by distillation under reduced pressure: the aqueous emulsion is then again concentrated by distillation under reduced pressure up to a 25–50%, preferably 40–45% dry content.

Such concentrated emulsion, if necessary, can be stabilized by the addition of an inorganic phosphorus salt, such as sodium phosphate, polyphosphates, etc., to avoid the formation of clots. Graft polymerization is then carried out on the copolymer in emulsion by heating at a temperature ranging from 25° to 150°C the concentrated aqueous emulsion of the copolymer containing the vinyl or vinylidene acid monomer to be grafted and an organic or inorganic radical initiator.

When the polymerization is completed, fluid and homogeneous latices having high stability are discharged.

The grafted copolymer thus obtained has a content of polymer chains of the vinyl or vinylidene acid monomer in the range of from 0.1 to 40%. The best results from the adhesion standpoint are reached using latices of copolymers containing amounts of acid grafted polymer between 2 and 25%.

The grafted product consists mostly of polymer chains that are obtained by polymerization of the polar monomer grafted onto the terpolymer chains prevailingly in the positions wherein free-radicals are formed by chain transfer (tert.carbon atoms or unsaturated groups).

The crude product contains, furthermore, a certain amount of free polar homopolymer whose formation is due to free-radicals with low molecular weight that are originated from the omolytic degradation of the radical initiator whereas the free-radicals with a high molecular weight that are linked to the polymer chain are mainly used for the reaction of grafting and only very little for the cross-linking of chains. The crude grafted product, therefore, consists of grafted molecules formed by polar polymer chains grafted onto the copolymer or terpolymer chains, of a non-grafted polar homopolymer and possibly of small amounts of unreacted copolymer or terpolymer.

The aqueous latexes of the grafted copolymers have the appearance of fluid and homogeneous materials having a high mechanical stability.

The aqueous latexes prepared according to the process of this invention yield by means of drying flexible films capable of adhering on different supports which renders these materials usable in the field of water paints.

The capability of the carboxy groups of reacting with polybasic substances such as for examples polyamines, polyvalent metal oxides, etc. with the crosslinking of the material permits to obtain from the latexes, films having good elastomeric properties and a high resistance to solvents and capable of strongly adhering onto polar surfaces of glass or metallic type or onto natural and synthetic fibres.

The adhesive characteristics of the films obtained from the latexes prepared according to the process of this invention make them usable for attaining a contact adhesion between surfaces having similar or different characteristics, for example for adhering hydrocarbon elastomers from olefins (such as the ethylene-alpha-olefin copolymer or the terpolymer used for the grafting) onto natural or synthetic fibres, for wood-metal adhesion, for obtaining non-woven fabrics and in the technology of the synthetic leather.

The non-tackiness of the film obtained by evaporating the water makes the latexes usable as auxiliary agents for textiles such as water-proof agents, for the finishing of wash and wear fabrics and softeners for anti-crease resins. Furthermore, they can be used in the paper industry for the surface treatment of the manufactured product.

For the making of articles consisting of a rubbery layer and a layer made up of cellulose fibres, it is of paramount importance to obtain a particularly strong bonding also under the hardest heating conditions (such as the ones brought about by dynamic stresses).

Such problems are encountered, as well known, e.g. in the manufacturing of tires, conveyor belts, driving belts and rubberized fabrics.

In Applicant's earlier patent applications, the problem of adhesion between olefin copolymers and textile fibres has been solved by using, as adhesive, solutions in organic solvents of ethylene-propylene copolymers that are chlorosulphonated or grafted with maleic acid, and capable of adhering both to the fiber, particularly when it is treated with conventional phenol resins, and to the elastomeric layer as such, i.e. to the unmodified layer.

Though these methods have given satisfactory results, it was however highly desirable to work in the presence of aqueous mixture, instead of organic solutions which are often dangerous because of their inflammability, volatility and possible formation of explosive mixtures with air.

We have now found that a very satisfactory adhesive bonding can be provided using an aqueous solvent-free, dispersion of a phenol-aldehyde resin and a stable aqueous latex of an elastomeric polymer of ethylene grafted with a vinyl or vinylidene monomer having an acid group and containing an anionic surface active agent, said dispersion having been aged for 10–80 hours prior to use.

The process for bonding an elastomeric polymer of ethylene to a non-compatible substrate such as a natural and synthetic fiber comprises pretreating said fiber with an aqueous dispersion consisting of a phenol-aldehyde resin and a stable aqueous latex of an elastomeric polymer of ethylene grafted with a vinylidene monomer having an acid group and containing an anionic surface active agent, said dispersion having been aged for 10–80 hours prior to use, then applying on the pretreated fiber a layer consisting of a mix containing the elastomeric polymer of ethylene, curing agents and a reinforcing filler, and finally curing the whole by heating at 110°–220°C, and preferably at 140°–180°C.

To prepare the aqueous dispersion, the latex of grafted copolymer is admixed with an aqueous solution of a polyvalent phenol and an aldehyde.

The ratio between the amounts of grafted copolymer and the polyvalent phenol-formaldehyde mixture used can be varied within very wide limits, e.g. from 0,1 : 1 to 1:1 by weight.

The mixtures of polyvalent phenol and formaldehyde contain said substances in ratios ranging from 0,1 to 1:1 by weight. As polyvalent phenol, resorcinol is preferred, and the aldehyde used is formaldehyde.

As the graft polymerization reaction can proceed per se also by crosslinking the olefinic polymer used, it is possible, if necessary, to reduce this phenomenon by adding to the initial latex, together with monomer and initiator, a substance capable of acting as chain transfer, such as a halogenated or halogen-free hydrocarbon such as carbon tetrachloride, carbon tetrabromide, chloroform, methylene chloride, tetraline, cumene and others in amounts from 2 to 20 parts pro 100 parts of copolymer present in the latex.

These organic substances, if used, are removed from the latex at the end of the graft polymerization by distillation under reduced pressure.

The aqueous latex of grafted polymer is stable and can be preserved for months without alteration.

When the resorcinol-formaldehyde resin solution is added to the latex of grafted polymer, the maturing time of said resin in the presence of the latex is of particular importance in order to obtain good final results with respect to adhesion.

We have found that to obtain the best adhesion values between the fibers treated with the suspension and the polymer, particularly when not treated, the suspension has to be matured for 10 to 80 hours, preferably from 55 to 70 hours. Longer maturing times bring about the formation of gels.

The fibers or fabrics are treated with the final adhesive dispersion according to conventional techniques, e.g., by immersion, smearing, friction, etc. and then the thus treated fibers are allowed to dry up to a constant weight.

They are contacted, in the most suitable ways according to various techniques well known in the art, with the mix based on the copolymer or the terpolymer and containing curing agents, i.e. an organic peroxide as a free-radical generator and a free-radical acceptor such as sulphur and, in case, reinforcing fillers and additives. When the terpolymer is used, curing agents based on sulfur and accelerators can also be used.

The whole mass is then subjected to vulcanization in a press at temperature of 110°–220°C, preferably 140°–180°C according to per se known processes.

Peeling test according to the procedure ASTM D-1876-61 T is carried out on the resulting material to evaluate the adhesion between fabric and rubber.

The adhesion obtained by operating according to the present invention is good at room temperature and, what is more important, it reaches values still very satisfactory at higher temperature (90°).

The reinforcing fillers for the ethylene-alpha-olefin copolymer and for the terpolymer can belong to any one of the types of carbon black or of mineral fillers.

The organic peroxide is used in the vulcanization process in amounts between 0.1 and 10 parts by weight per 100 parts of copolymer or terpolymer, and sulfur in an amount which is lower than half the amount by weight of peroxide used.

The adhesion tests with rayon fabric were carried out using commercial square rayon consisting of 12 mesh per 1 cm of cord and having a 0.65 mm diameter.

The invention is illustrated by the following examples without limiting its scope; it is, however, understood that the variations which can be made to the described embodiment will always fall within the scope of the present invention.

EXAMPLE 1 a. Preparation of the aqueous copolymer latex:

100 g of an ethylene-propylene copolymer having an intrinsic viscosity of $1.96 \times 10^2$ cc/g determined in toluene at 30°C and containing 62 mols % of propylene are batched with 900 g of toluene. To the paste thus obtained, 12 g of Phenopon Co 436 (The ammonium salt of sulphate of an alkylphenol-polyethyleneoxyethanol with a 55% content of active substance.) and 900 g of water are added. The mass is then subjected for 15 minutes to the action of a mechanical (Ultra Turrax) emulsifier. An emulsion having homogeneous aspect is obtained, from which the solvent is removed by distilling the toluene-water azeotrope from the mass kept in agitation under the reduced pressure of 40 mm Hg under nitrogen.

The aqueous emulsion is then concentrated up to a dry residue of 37% by water distillation under reduced pressure.

b. Graft polymerization 170 g of the latex prepared as under a) are added while keeping the mass under agitation to 1.35 g of benzoyl peroxide batched with 1.3 g Phenopon Co 436 and dispersed in 14 g of water.

To the mass under agitation successively there are slowly added 12.1 g glacial acrylic acid freshly distilled and dissolved in 14 g of deionized water. The mixture is placed in a 4-neck reactor provided with a stirrer, a cooler and a bubbler. Air is removed by bubbling nitrogen through the mass and the flask is placed in a bath at 85°C, while keeping the mass under agitation in an atmosphere of inert gas.

After 6 hours the polymerization is completed. 212 g of a fluid latex are discharged from which 3 g of clots and 209 g of a latex having homogeneous aspect and a 35% dry residue, are separated by filtration.

10 g of latex are coagulated with acetone and the precipitate washed with water until the free polyacrylic acid is removed. The amount of acrylic acid chemically bound to the polymer, which is determined by salification with alcoholic potash of the residue after aqueous extraction, is of 10.6%.

1 g of the residue after aqueous extraction, treated for 5 hours with 500 g of boiling toluene yields insoluble gels, which after drying constitute 50% of the initial material.

c. Preparation of an adhesive mix using graft copolymer and adhesion tests therewith.

83 g of latex of an ethylene-propylene copolymer grafted with acrylic acid prepared as in example 1 b), are mixed with 129 g of a solution having the following composition and allowed to age for one hour prior to use:

| resorcinol | 11 g | |
|---|---|---|
| 35% formaldehyde | 68 g | $\dfrac{\text{resorcinol mols}}{\text{formaldehyde mols}} = 0.125$ |
| water | 100 g | |
| 30% caustic soda | 1 g | |

The ratio between the weight of the solids contained in solution and the weight of those in the latex is of 0.87.

After 72 hours maturing, the square rayon fabric is immersed in the prepared adhesive mix and subsequently dried by evaporating water in an oven at 80°C.

The total amount of dry adhesive settled on the fabric is of 5%.

The treated fabric is placed between two layers of a blend based on ethylene-propylene copolymer, of the following composition:

| Ethylene-propylene copolymer - Mooney viscosity ML ( 1 + 4 ) 100°C = 20, propylene content: 62% by mols | 100 parts by weight |
|---|---|
| ISAF Carbon black | 50 parts by weight |
| Sulfur | 0.3 parts by weight |
| 100% Dicumyl peroxide | 4 parts by weight |

The fabric-mix system is vulcanized for 30 minutes in a press under a pressure of 40 kg/cm² and at the temperature of 140°C. The adhesion values at the various temperatures are as follows:

| T°C | Peeling test Bonding strength kg/cm |
|---|---|
| 20°C | 6.3 |
| 40°C | 4.3 |
| 60°C | 3.8 |
| 90°C | 4.0 | d. Counter-example = Preparation of an adhesive mix using a non-grafted copolymer and adhesive tests therewith.

79 g of the latex prepared according to example 1 a) and consisting of an emulsion of an ethylene-propylene copolymer as such, are mixed with 129 g of a solution having the following composition, which had been allowed to stand for one hour prior to use:

| resorcinol | 11 g | |
|---|---|---|
| 35% formaldehyde | 17 g | $\dfrac{\text{resorcinol mols}}{\text{formaldehyde mols}} = 0.5$ |
| water | 100 g | |
| 30% caustic soda | 1 g | |

To the latex-solution mix of resorcinol-formaldehyde, 42.2 g of water are added.

The ratio between the weight of solid content in the solution and the one in the latex is equal to 0.59.

After 48 hours maturing time, the square rayon fabric is immersed into the adhesive mix and then dried in an oven at 80°C by evaporating water.

The total amount of dry adhesive deposited is 5%.

The treated fabric is placed between two layers of a blend based on ethylene-propylene copolymer, having the following composition:

| Ethylene-propylene copolymer - Mooney viscosity ML (1 + 4) 100°C = 20, propylene content: 62% by mols | 100 | parts by weight |
|---|---|---|
| ISAF Carbon black | 50 | do. |
| Sulfur | 0.3 | do. |
| 100% Dicumyl peroxide | 4 | do. |

The fabric-mix system is vulcanized in a press for 30 minutes under a pressure of 40 kg/cm², at the temperature of 140°C. The adhesion value is 0.8 kg/cm at 23°C.

EXAMPLE 2

83 g of latex of an ethylene-propylene copolymer grafted with acrylic acid prepared according to example 1 b) are mixed with 129 g of a solution having the following composition aged for one hour:

| resorcinol | 11 g | |
|---|---|---|
| 35% formaldehyde | 17 g | $\dfrac{\text{resorcinol mols}}{\text{formaldehyde mols}} = 0.5$ |
| water | 100 g | |
| 30% caustic soda | 1 g | |

To the latex-solution mix of resorcinol-formaldehyde, 37.7 g water are added.

The ratio between the weight of solid content in the resorcinol-formaldehyde solution and the weight of the one in the latex is 0.59.

After different maturing times, the square fabric is immersed in the adhesive mix and then dried in an oven at 80°C by evaporating water.

The total amount of dry adhesive settled on the strips is 5%.

Specimens for the adhesion tests are prepared according to the procedure described in the preceding examples. The results are condensed in the following table:

| Maturing time h | Temperature at which the tests are carried out °C | Adhesion kg/cm |
|---|---|---|
| 0 | 20 | 7.2 |
|  | 40 | 5.3 |
|  | 60 | 3.5 |
|  | 90 | 1.5 |
| 24 | 20 | 8.5 |
|  | 40 | 5.1 |
|  | 60 | 4.4 |
|  | 90 | 3.2 |
| 72 | 20 | 9.0 |
|  | 40 | 5.1 |
|  | 60 | 4.5 |
|  | 90 | 3.5 |

EXAMPLE 3

By operating as in example 1 a) an aqueous emulsion of an ethylene-propylene copolymer having an intrinsic viscosity determined in toluene at 30°C of 1.73 × 10² cc/g and containing 50% by mols of propylene is prepared.

The aqueous emulsion is concentrated up to a dry residue of 42.0%. 0.3 g of sodium hexamethaphosphate dissolved in 5 g of water are added to 75 g of the obtained latex and then while the mass is maintained under agitation, 0.68 g of benzoyl peroxide mixed with 0.5 g of Phenopon Co 436 and dispersed in 6 g of water and then 6 g of acrylic acid dissolved in 13 g of water are added thereto. The mix is placed in a 4-neck flask provided with a stirrer, cooler and bubbler.

Air is removed by bubbling nitrogen through the mass and the flask is immersed in a bath at 85°C, while keeping the mass under agitation in an atmosphere of inert gas.

After 6 hours the polymerization is completed. There are discharged 106.5 g of a fluid latex, from which no clots can be separated by filtration and having a dry residue of 36.4%.

The amount of acrylic acid chemically bound to the copolymer, determined by salification with alcohol potash of the coagulated product and deprived of free polyacrylic acid by washing with water, is 10%.

1 g of the residue after aqueous extraction, treated for 5 hours boiling with 500 g toluene yields insoluble gels which, after drying, constitute 50% of the initial material. 80 g of latex of ethylene-propylene copolymer grafted with acrylic acid are mixed with 129 g of a solution having the following composition, and allowed to age for 1 hour prior to use:

| | | | |
|---|---|---|---|
| resorcinol | 11 g | | |
| formaldehyde | 17 g | $\dfrac{\text{resorcinol mols}}{\text{formaldehyde mols}}$ | = 0.5 |
| water | 100 g | | |
| 30% caustic soda | 1 g | | |

41 g of water are added to the latex solution mix of resorcinol-formaldehyde.

The ratio between the weight of solid contained in the resorcinol-formaldehyde solution and the weight of the solid content in the latex is 0.59.

After 48 hours maturing, the square rayon fabric is immersed in the adhesive mix and successively dried by water evaporation in an oven at 80°C.

The total amount of dry adhesive deposited on the strips is of 5%.

Specimens for adhesion tests are prepared according to the preceding examples. The adhesion value is 7 kg/cm at 25°C.

EXAMPLE 4

By operating as in example 1 a) an aqueous emulsion of an ethylene-propylene copolymer having an intrinsic viscosity determined in toluene at 30°C of $1.96 \times 10^2$ cc/g and containing 62 mols percent of propylene is prepared.

The aqueous emulsion is concentrated up to a dry residue of 41.8% by water distillation under reduced pressure.

75 g of the prepared latex are added, while keeping the mass under agitation to 0.675 g of benzoyl peroxide admixed with 1 g of Phenopon Co 436 and dispersed in 8 g of water.

Successively 4.75 g of methacrylic acid dissolved in 15.5 g of water are slowly added to the mass maintained under agitation. The mix is placed into a 4-neck flask provided with stirrer, cooler and bubbler.

Air is removed by bubbling nitrogen through the mass and the flask is placed in a bath at 85°C while maintaining the mass under agitation in an atmosphere of inert gas.

After 6 hours the polymerization is completed.

There are discharged 105 g of a fluid latex from which 1 g of clots and 104 g of a latex having a homogeneous aspect with a dry residue of 35% are separated.

10 g of the latex are coagulated with acetone and the precipitate is washed with water until free polymethacrylic acid is removed.

The amount of methacrylic acid chemically linked to the used copolymer, determined by salification with alcoholic potash of the residue after water extraction is of 9.5%.

1 g of the residue after aqueous extraction treated for 5 hours with 500 g of boiling toluene yields insoluble gels, which after drying constitute 60% of the initial material.

75 g of the latex of the ethylene-propylene copolymer grafted with methacrylic acid are mixed with 129 g of a solution having the following composition and allowed to age for 1 hour prior to use:

| | | | |
|---|---|---|---|
| resorcinol | 11 g | | |
| 35% formaldehyde | 17 g | $\dfrac{\text{resorcinol mols}}{\text{formaldehyde mols}}$ | = 0.5 |
| water | 100 g | | |
| 30% caustic soda | 1 g | | |

46 g of water are added to the latex solution mix of resorcinol-formaldehyde. The ratio between the weights of the solid contained in the solution and the one in the latex is equal to 0.66.

After 40 hours maturing, the square rayon fabric is immersed in the adhesive mix and is then dried by water evaporated in an oven at 80°C.

The total amount of adhesive deposited is 5%.

The treated fabric is placed between two layers of a mix based on ethylene-propylene copolymer having the following characteristics:

| | | |
|---|---|---|
| Ethylene-propylene copolymer - Mooney viscosity ML (1 + 4) 100°C = 25; propylene content: 62% by mols | 100 | parts by weight |
| ISAF Carbon black | 50 | do. |
| Sulfur | 0.3 | do. |
| alpha, alpha' bis (tert.butyl-peroxy)-diisopropylbenzene (Peroximon 100%) | 1.65 | do. |

The fabric-mix system is vulcanized for 30 minutes in a press under a pressure of 40 kg/cm² at the temperature of 140°C.

The adhesion value is 4.5 kg/cm at 25°C.

EXAMPLE 5

By operating as in example 1 a) an aqueous emulsion of an ethylene/propylene/cyclooctadiene-1,5 terpolymer having an intrinsic viscosity determined in toluene at 30°C of $1.61 \times 10^2$ cc/g and containing 2% by mol of cyclooctadiene-1,5 and 57% by mol of propylene is prepared.

The aqueous emulsion is concentrated up to a dry residue of 36%. To 230 g of the obtained latex are added, while keeping the mass under agitation, 1.66 g of benzoyl peroxide dissolved in 20 g of toluene and then 15 g of acrylic acid dissolved in a solution of 2 g of Penopon Co 436 in 46 g of water. The mix is placed into a 4-neck flask provided with stirrer, cooler and bubbler.

The air is removed by bubbling nitrogen through the mass and the flask is placed in a bath at 85°C maintaining the mass under agitation in an atmosphere of inert gas.

After 6 hours the polymerization is completed. There are discharged 314.5 grams of a fluid latex from which 1.5 grams of clots and 313 grams of a latex having a homogeneous aspect with a dry residue of 31.4% by filtration are separated.

10 grams of the latex are coagulated with acetone and the precipitate is washed with water until free polyacrylic acid is removed. The amount of acrylic acid chemically linked to the terpolymer, determined by salification with alcoholic potash of the residue after water extraction is of 2.6%.

1 gram of the residue after aqueous extraction treated for 5 hours with 500 grams of boiling toluene yields insoluble gels which after drying represent 85% of the initial material.

97 grams of the latex of the ethylene/propylene/cyclooctadiene-1,5 terpolymer grafted with acrylic acid are mixed with 153 grams of a solution having the following composition and allowed to age for one hour prior to use:

| resorcinol | 11 g | | |
|---|---|---|---|
| 35% formaldehyde | 17 g | resorcinol mols / formaldehyde mols | = 0.5 |
| water | 124 g | | |
| 30% caustic soda | 1 g | | |

After 72 hours maturing, the square rayon fabric is immersed in the adhesive mix and is then dried by water evaporation in an oven at 80°C. The total amount of dry adhesive deposited on the fabric is 5%.

The treated fabric is placed between two layers of a mix based on an ethylene/propylene/cyclooctadiene-1,5 terpolymer having a propylene content of 48% by mols, a cyclooctadiene-1,5 content of 2.3% by mols and a Mooney viscosity ML (1 + 4) 100°C = 27.5.

| The mix has the following composition: | | |
|---|---|---|
| Terpolymer | 100 | parts by weight |
| HAF Carbon black | 50 | do. |
| Zinc oxide | 3 | do. |
| Stearic acid | 0.5 | do. |
| Phenyl-β-naphthylamine | 1 | do. |
| Tetramethylthiuram-disulphide | 1 | do. |
| Mercaptobenzothiazol-disulphide | 1 | do. |
| Sulfur | 2 | do. |

The fabric-mix system is vulcanized in a press under a pressure of 40 kg/cm² at a temperature of 150°C for 50 minutes.

The adhesion value is 5 kg/cm at 25°C.

EXAMPLE 6

By operating as in example 1 a), an aqueous emulsion of an ethylene-propylene copolymer was prepared having an intrinsic viscosity, determined in toluene at 30°C of 1.37 × 10² cc/g and containing 50 mols % of propylene.

The aqueous emulsion was concentrated to a dry residue of 40%.

1.5 g of sodium hexa-meta-phosphate dissolved in 56 g water were added to 397 g of the prepared latex; then, while keeping the mass under stirring, 3.45 g of benzoyl peroxide, 16 g of freshly distilled methylacrylate and 16.5 g of acrylic acid dissolved in 50 g water were added.

The mix was put in a four-neck flask equipped with refrigerator, stirrer, and bubbler. Air was removed by bubbling nitrogen through the mass, and the flask was put in a bath at 85°C while keeping the mass under stirring under an inert gas atmosphere. The polymerization was complete after 7 hours. 540 g of slightly fluid latex were discharged; by filtering it, no separation of clots occurred and the separated latex had a dry residue of 36.5%.

The acrylic acid and methylacrylate linked to the copolymer, determined by salification with alcoholic potassium hydroxide of the product coagulated and purified by washing with water from free polyacrylic acid, was of 12%, expressed as acrylic acid.

One g of the residue to the water extraction, treated at the boiling temperature for 5 hours with 500 g of toluene gave toluene-insoluble gels, which, after drying, were 71% of the starting material.

80 g of the latex of an ethylene-propylene copolymer grafted with acrylic acid and methylacrylate were mixed with 129 g of a solution having the following composition:

| resorcinol | 11 g | | |
|---|---|---|---|
| formaldehyde 35% | 17 g | resorcinol mols / formaldehyde mols | =0.5 |
| water | 100 g | | |
| sodium hydroxide 30% | 1 g | | |

41 g of water was added to the mixture of latex-resorcinol formaldehyde solution.

After 70 hours of maturing the commercial square rayon fabric was immersed in the adhesive mixture. Then it was dried by evaporation of water in an oven at 80°C. When operating as in the previous examples, test specimens were prepared to measure adhesion, which was a value of 7 kg/cm at 25°C.

EXAMPLE 7 a. Preparation of the aqueous latex of terpolymer.

An aqueous latex is prepared by using an ethylene/propylene/cyclooctadiene-1,5 terpolymer having the following characteristics: Mooney viscosity ML (1+4) at 100°C = 55, intrinsic viscosity in toluene at 30°C = 1.61 × 10² cc/g; propylene content = 57.4% by mols; cyclooctadiene content = 1.39% by mols.

The impurities capable of hindering the graft reaction have been removed from the terpolymer by subjecting the crude polymerizate to extraction with acetone in a Kumagawa extractor for 170 hours.

100 g of this material are suspended in 900 g of toluene. 12 g of Fenopon CO 436 and 900 g of dejonized water are added to the paste thus obtained and the mass is then subjected for 15 minutes to the action of a mechanical emulsifier Ultra Turrax for 15 minutes.

An emulsion having a homogeneous appearance is obtained from which the organic solvent is removed by distillation of the toluene-water azeotrope from the mass kept in agitation under the reduced pressure of 40 mmHg under nitrogen.

The aqueous emulsion is then concentrated by distilling off water until an emulsion having a dry residue of 41.5% is obtained.

b. Graft polymerization

To 352 g of the latex prepared as in 7a), 3.45 g of benzoyl peroxide mixed with 1.42 g of Fenopon CO436 and dispersed in 20 g of water are added. The mass is kept in agitation and 1.42 g of sodium hexamethaphosphate dissolved in 20 g of water and then 37.5 g of a mixture consisting of 80% of acrylic acid and 20% of methacrylic acid dissolved in 66 g of dejonized water are added.

The mixture is placed in a 4-necked reactor provided with an agitator, reflux condenser and a bubbler.

Air is eliminated by bubbling nitrogen through the agitated mass and the flask is placed in a bath kept at 85°C, keeping the mass in continuous agitation under an inert gas atmosphere.

After 6 hours the polymerization is complete.

501 g of latex are discharged from which 4 g of coagulated material are separated by filtration.

The latex is fluid and has a homogeneous appearance and a dry residue of 37%.

10 g of latex are coagulated in acetone and the precipitate is washed with warm water until the free homopolymers are eliminated.

The amount of acid chemically bound to the polymer expressed as acrylic acid, and determined by salification with alcoholic potash of the residiue after aqueous extraction is 9.2%.

EXAMPLE 8

0.61 g of benzoylperoxide mixed with 0.5 g of Fenopon CO 436 and dispersed in 5 g of $H_2O$ are added to 67 g of the latex prepared in Example 7a) having a dry residue of 41.5%.

0.21 g of sodium hexamethaphosphate in 5 g of water and 5 g of crotonic acid in 39 g of dejonized water are then added.

The mix is placed in a 4-necked reactor provided with an agitator, reflux condenser and bubbler.

Air is eliminated by bubbling nitrogen through the mass and the flask is placed in a bath kept at 95°C, while keeping the mass in agitation under an inertt gas atmosphere.

After 6 hours the polymerization is complete.

122 g of a fluid homogeneous latex having a dry residue of 27.8% are discharged.

10 g of latex are coagulated in acetone and the precipitate is abundantly washed with water until the free acid is eliminated.

The amount of crotonic acid chemically bound to the polymer, determined by salification with alcoholic potash of the residue after aqueous extraction, is 4%.

EXAMPLE 9

By operating as in Example 7a) and using the same terpolymer specified in Example 7a), extracted with acetone, an aqueous latex having a dry residue of 45.5% is prepared.

1.22 g of benzoyl peroxide mixed with 0.6 g of Fenopon CO 436 and dissolved in 10 g of water are added to 140 g of this latex, by keeping the mass in agitation.

0.6 g of sodium hexamethaphosphate dissolved in 10 g of water and 12.5 g of fresh-distilled glacial methacrylic acid dissolved in 36 g of dejonized water are then added.

The mix is placed in a 4-necked reactor provided with an agitator, a reflux condenser and bubbler.

Air is eliminated by bubbling nitrogen through the mass and the flask is placed in a thermostatic bath kept at 95°C while keeping the mass in continuous agitation under an inert gas atmosphere.

After 6 hours the polymerization is complete.

210 g of latex are discharged from which 1.5 g of coagulated material are separated by filtration.

The grafted latex has a fluid homogeneous appearance and has a dry residue of 37%.

10 g of latex are coagulated in acetone and the precipitate is washed with warm water until the free polymethacrylic acid is eliminated.

The amount of methacrylic acid chemically bond to the polymer, determined by salification with alcoholic potash of the residue after aqueous extraction, is 12.2%.

EXAMPLE 10

By operating as in Example 7a) an aqueous latex having a dry residue of 41.5% is prepared by using an ethylene/propylene/cyclooctadiene-1,5 terpolymer, deprived of the impurities capable of hindering the graft reaction by extraction of the crude polymerizate with acetone in a Kumagawa extractor for 170 hours and having the following characteristics:

Mooney viscosity ML (1+4) 100°C = 27 intrinsic viscosity (in toluene at 30°C) = $1.38 \times 10^2$ cc/g propylene content = 47.9% by mols cyclooctadiene-1,5 content = 1.08% by mols.

3.2 g of benzoyl peroxide mixed with 1.6 g of Fenopon CO 436 and dispersed in 32 g of water are added to 360 g of this latex while keeping the mass in agitation.

To the mass still kept in agitation 1.4 g of sodium methaphosphate in 29 g of water and 28 g of fresh distilled glacial acrylic acid dissolved in 44 g of dejonized water are then added.

The mixture is placed in a 4-necked reactor provided with an agitator, a reflux condenser and a bubbler.

Air is removed by bubbling nitrogen through the mass and the flask is placed in a bath at 85°C while keeping the mass in agitation under an inert gas atmosphere.

After 6 hours the polymerization is complete.

499 g of a fluid latex having a homogeneous appearance and a dry residue of 36.5% are discharged.

10 g of latex are coagulated with acetone and the precipitate is washed till the free polyacrylic acid is eliminated.

The amount of acrylic acid chemically bound to the polymer, determined by salification with alcoholic potash of the residue after aqueous extraction is 10.2%.

This product can be used for realizing the adhesion between cellulose textile fibres (e.g. those used for the manufacture of tires) and saturated or low-unsaturation olefin elastomers which per se are incompatible with cellulose fibres.

EXAMPLE 11

By operating as in Example 7a) an aqueous latex is prepared by using a crude ethylene/propylene/dicyclopentadiene terpolymers having an intrinsic viscosity (in toluene at 30°C) of $1.61 \times 10^2$ cc/g and containing 48% by mols of propylene and 1% by mols of dicyclopentadiene.

The emulsion is concentrated by distillation of toluene and water until an aqueous emulsion having a dry residue of 36% is obtained.

1.66 g of benzoyl peroxide dissolved in 20 g of toluene and then 15 g of fresh distilled acrylic acid dissolved in a solution of 2 g of Fenopon CO 436 in 46 g of water are added to 230 g of this latex while agitating.

The mixture is placed in a 4-necked flask provided with an agitator, a reflux condenser and a bubbler.

Air is eliminated by passing nitrogen through the mass and the flask is immersed into a thermostatic bath at 85°C, while keeping the mass in continuous agitation and under an inert gas atmosphere.

After 6 hours the polymerization is complete.

314 g of latex are discharged from which 1.5 g of co-agulated product are separated by filtration.

The latex appears to be fluid and homogeneous and has a dry residue of 31.5%.

By evaporation of water, continuous elastic films, strongly adhering to a glass support are obtained.

The mechanical properties of the film are:
tensile strength = 54.15 kg/cm$^2$
elongation at break = 385%

10 g of latex are coagulated in acetone and the coagulated product is washed with water until the homopolymer (polyacrylic acid) is eliminated.

The amount of acrylic acid chemically bound to the polymer, determined by salification with alcoholic potash of the residue after aqueous extraction, is 12.6%.

EXAMPLE 12

By operating as in Example 7a) an aqueous emulsion of an ethylene/propylene/cyclooctadiene-1,5 terpolymer having an intrinsic viscosity, determined in toluene at 30°C, of $1.61 \times 10^2$ cc/g and containing 2.3% by mols of cyclooctadiene-1,5 and 48% by mols of propylene, is prepared.

The aqueous emulsion is concentrated up to a dry residue of 36%.

1.66 g of benzoyl peroxide dissolved in 20 g of toluene and then, always keeping the mass in agitation, 15 g of acrylic acid dissolved in a solution of 2 g of Fenopon CO 436 in 46 g of water are added to 230 g of the latex obtained.

The mixture is placed in a 4-necked flask provided with an agitator, a reflux condenser and a bubbler.

Air is eliminated by bubbling nitrogen through the mass and the flask is placed in a bath at 85°C while keeping the mass in agitation under an inert gas atmosphere.

After 6 hours the polymerization is complete.

314.5 g of latex are discharged from which 1.5 g of clots and 313 g of a latex having a homogeneous appearance and a dry residue of 31.4% are separated by filtration.

10 g of latex are coagulated with acetone and the precipitate is washed with water till the free polyacrylic acid is eliminated.

The amount of acrylic acid chemically bound to the polymer, determined by salification with alcoholic potash of the residue after aqueous extraction, is 2.6%.

1 g of the residue after aqueous extraction, treated for 5 hours with 500 g of toluene at the boiling point, gives gels insoluble in toluene which, after drying, represent 85% of the starting material.

97 g of the latex of ethylene/propylene/cyclooctadiene-1,5 terpolymer grafted with acrylic acid, are mixed with 153 g of a solution having the following composition, which has been matured for 1 hour before its use:
resorcinol 11 g
35% formaldehyde 17 g
water 124 g
30% sodium hydroxide 1 g
resorcinol/formaldehyde molar ratio = 0.5

After a maturation time of 72 hours the square rayon fabric is immersed in the adhesive mixture thus prepared and is successively dried by water evaporation in an oven at 80°C.

The total amount of dried adhesive deposited on the fabric is 5%.

The treated fabric is placed between two layers of a mix based on an ethylene/propylene/cyclooctadiene-1,5 terpolymer having a propylene content of 48% by mols, a cyclooctadiene-1,5 content of 2.3% by mols and a Mooney viscosity ML (1+4) 100°C = 27.5.

The mix has the following composition:

| Terpolymer | 100 | parts by weight |
|---|---|---|
| Carbon black HAF | 50 | do. |
| Zinc oxide | 3 | do. |
| Stearic acid | 0.5 | do. |
| Phenyl-beta-naphthylamine | 1 | do. |
| Tetramethylthiuramdisulphide | 1 | do. |
| Mercaptobenzothiazol disulphide | 1 | do. |
| Sulfur | 2 | do. |

The fabric-mix system is vulcanized for 50 minutes in a press under a pressure of 40 kg/cm$^2$ at the temperature of 150°C.

The adhesion value is 5 kg/cm at 25°C.

While the present invention has been described with particular reference to specific examples, it is to be understood that these examples are for purposes of illustration and that the invention is not limited thereto, since many variations and modifications can be practiced without departing from its spirit and scope.

Having described the invention, what it is desired to secure and claim by Letters Patent is:

1. In a process for bonding (1) a saturated copolymer of ethylene with an alpha-olefin or (2) a terpolymer of ethylene with an alpha-olefin and a cyclic or acyclic diene having non-conjugated double bonds, said terpolymer having a low degree of unsaturation, to natural or synthetic fibers, said process comprising impregnating said fibers with an aqueous dispersion of phenol-formaldehyde resin and an aqueous elastomeric latex containing one or more surface-active agents, the pH of said dispersion of latex and phenol-formaldehyde resin having been matured for a time of from about 10 to 80 hours, so as to effect a solids content in the treated fibers, on a dry basis, of about 5% by weight, drying the thus treated fibers, assembling said fibers with an elastomeric mixture consisting essentially of the above defined copolymer or terpolymer and of a vulcanizing agent, and vulcanizing by heating at a temperature of from about 110° to 220°C, the improvement comprising employing as the elastomeric component of said latex a saturated elastomeric ethylene-alpha-olefin copolymer or a low-unsaturation elastomeric terpolymer of ethylene/alpha-olefin/cyclic or acyclic diene having non-conjugated double bonds that is grafted with an acid water-soluble vinyl or vinylidene monomer selected from the group consisting of acrylic acid, methacrylic acid, mixtures thereof, mixtures of one of said acids with a lower alkylester thereof, lower alkylesters of acrylic acid, lower alkylesters of methacrylic acid, sorbic acid, muconic acid, crotonic acid and lower alkylesters thereof.

2. The process of claim 1, wherein the grafted copolymer has a content of polymer chains of the acid vinyl or vinylidene monomer used in the range of from 0.1 to 40 parts by weight per 100 parts of polymer.

3. The process of claim 1, wherein the ethylene-alpha-olefin copolymer to be bonded to the fiber and the grafted copolymer used as the elastomeric component of the latex is an ethylene-propylene copolymer having a molecular weight in the range of from 50,000 to 500,000 and an ethylene content between 20 and 80% by mols.

4. The process of claim 1, wherein the ethylene-alpha-olefin copolymer to be bonded to the fiber and the grafted copolymer used as the elastomeric component of the latex is an ethylene-butene-1 copolymer having a molecular weight in the range of from 50,000 to 500,000 and an ethylene content between 20 and 80% by mols.

5. The process of claim 1, wherein the elastomeric polymer of ethylene used is an amorphous terpolymer of ethylene/alpha-olefin/cyclic diene having non-conjugated double bonds.

6. The process of claim 5, wherein the terpolymer to be bonded to the fiber and the grafted terpolymer used as the elastomeric component of the latex is an ethylene/propylene/cyclooctadiene-1,5 terpolymer having a cyclooctadiene-1,5 content from 1 to 20% by mols, an ethylene content from 20 to 80% by mols, and a molecular weight in the range of 50,000 to 500,000.

7. The process of claim 5, wherein the terpolymer to be bonded to the fiber and the grafted terpolymer used as the elastomeric component of the latex is an ethylene/propylene/dicyclopentadiene terpolymer having a dicyclopentadiene content from 1 to 20% by mols, an ethylene content from 20 to 80% by mols, and a molecular weight in the range of 50,000 to 500,000.

8. The process of claim 5, wherein the terpolymer to be bonded to the fiber and the grafted terpolymer used as the elastomeric component of the latex is an ethylene/butene-1/cyclooctadiene-1,5 terpolymer having a cyclooctadiene-1,5 content from 1 to 20% by mols, an ethylene content from 20 to 80% by mols, and a molecular weight in the range of 50,000 to 500,000.

9. The process of claim 5, wherein the terpolymer to be bonded to the fiber and the grafted terpolymer used as the elastomeric component of the latex is an ethylene/butene-1/dicyclopentadiene terpolymer having a dicyclopentadiene content from 1 to 20% by mols, an ethylene content from 20 to 80% by mols, and a molecular weight in the range of 50,000 to 500,000.

10. The process of claim 1, wherein the elastomeric polymer of ethylene used is an amorphous terpolymer of ethylene/alpha-olefin/acyclic diene having non-conjugated double bonds.

11. The process of claim 1, wherein the vulcanizing agent consist of an organic peroxide and sulfur.

12. The process of claim 1, wherein the vulcanizing agent for the terpolymer consist of sulfur and accelerators.

13. The process of claim 1, wherein the fiber is made up of rayon.

14. The process of claim 1, wherein the fiber is a polyamide fiber.

15. The process of claim 1, wherein the fiber is a cotton fiber.

16. The process of claim 1, wherein the fiber is a polyester fiber.

17. As an article of manufacture, vulcanized articles obtained by the process of claim 1.

* * * * *